United States Patent
Blackwell et al.

[11] Patent Number: 5,908,211
[45] Date of Patent: Jun. 1, 1999

[54] FLEXIBLE PIPE JOINT SEAL

[76] Inventors: William Atwell Blackwell, 8751 Buckland Mill Rd., Gainesville, Va. 20155-2015; William Channing Blackwell, 1124 Lexan Ave., Norfolk, Va. 23508-1237

[21] Appl. No.: 09/052,930

[22] Filed: Apr. 1, 1998

[51] Int. Cl.[6] .................................................. F16L 47/00
[52] U.S. Cl. ...................................................... 285/294.2
[58] Field of Search ............................... 285/294.2, 230, 285/915, 373, 419, 294.1, FOR 169, FOR 170

[56] References Cited

U.S. PATENT DOCUMENTS

| | | | |
|---|---|---|---|
| 1,259,833 | 3/1918 | Burns | 285/294.2 |
| 2,050,023 | 8/1936 | Slayter | 285/294.2 |
| 3,100,658 | 8/1963 | Miller et al. | 285/230 |
| 5,531,485 | 7/1996 | House et al. | 285/294.2 |

*Primary Examiner*—Lynne A. Reichard
*Assistant Examiner*—David E. Bochna

[57] ABSTRACT

An in-ground installed pipe system that has flexible plastic-like wrapping at the pipe joints which consists of sealant backing on the underside of a flexible plastic-like cover material, this wrapping being of varying width and thickness, depending on need. The application of this system is quite simple: laying a pipe section in a trench to connect to an awaiting pipe end section. Once the two-pipe sections are connected, the wrapping is then placed around the pipe joint. Following this, tape is applied to the overlap of the wrapping. Once this is done, the pipe is ready and back filled. If there is movement at the joint, it will be accommodated by the flexible plastic-like sealant, which simultaneously maintains its function. The application of this flexible plastic-like wrapping, with sealant backing at the pipe joint, will allow for protection of the pipe joint should the primary joint fail. In some cases, this system can be used as the primary seal. This flexible plastic-like wrapping with the sealant backing system is mainly designed to give the pipe network greater longevity, liquid-tight integrity even if the primary seal fails, and nearly eliminates repair cost. The use of this flexible pipe joint seal system protects the pipe from infiltration of the surrounding groundwater into the pipe network, which process may overwhelm the wastewater treatment plant, possibly resulting in untreated sewage that will be dumped in rivers or oceans. Also, infiltration of contaminated fluid from the pipe network can infiltrate the surrounding soil and groundwater table, a serious consequence.

1 Claim, 1 Drawing Sheet

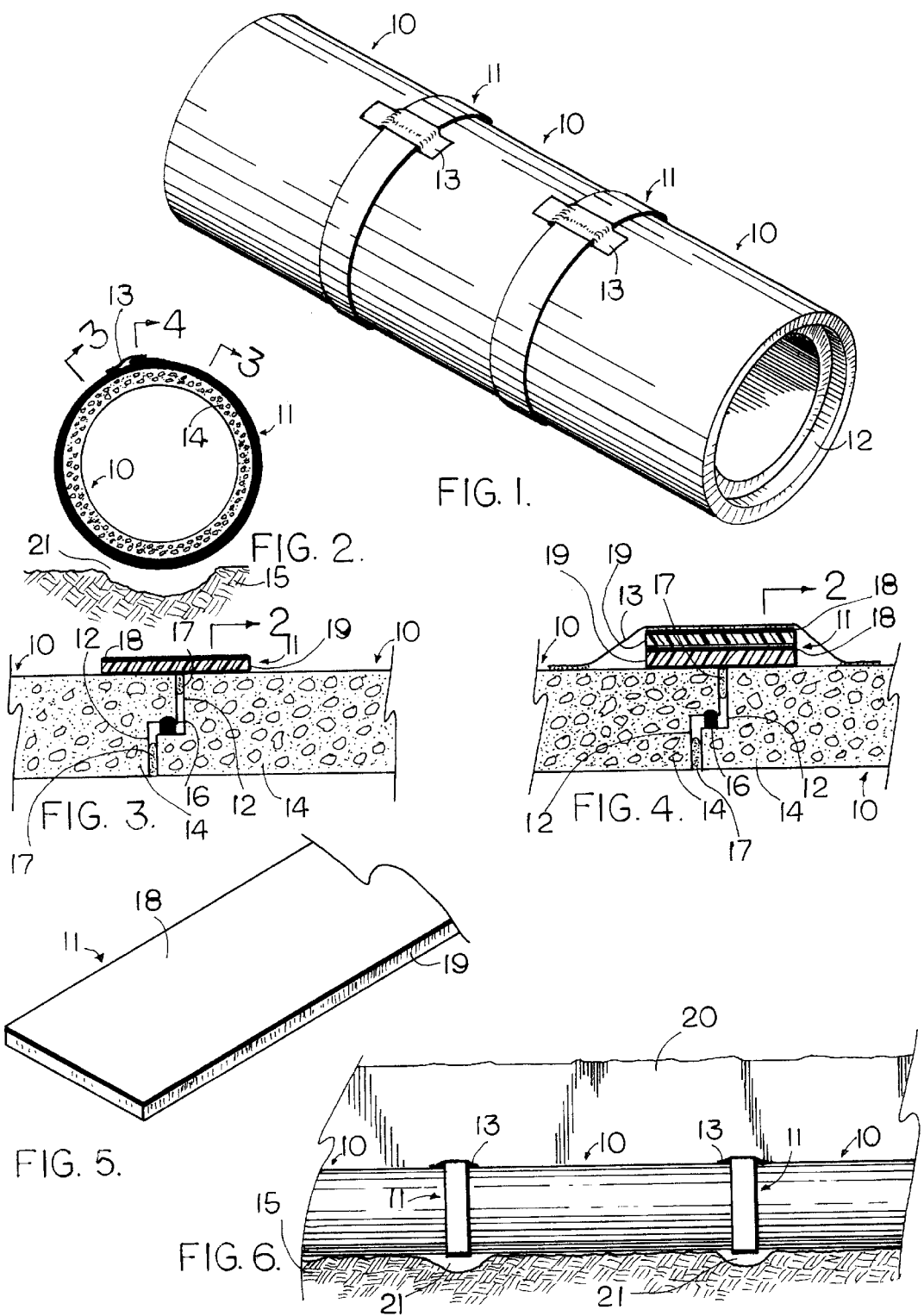

FLEXIBLE PIPE JOINT SEAL

BACKGROUND OF THE INVENTION

Field of the invention: in-ground pipe system network having flexible, sealant backed plastic-like wrapping applied around the outer circumference, at each pipe joint.

Currently, there are methods used in the attempt to provide a seal for in ground pipe system networks. In most cases, there is the pipe manufactures seal, which is designed to fit at the pipe ends, within the connection area. Some pipe ends have only offsets within the ends, to insure alignment, and cement mortar is applied to the joint. One present joint seal is an elaborate elastomeric band, designed to conform to the exterior shape configuration and pipe circumference. This type is expensive and time demanding, to obtain and install. Of the present methods used, generally there is the manufacturer's seal, usually a rubber gasket, designed to fit within the joint connection. There is also the mortared type joint on the outside, and, in case of large diameter pipe, mortared type on the inside. All of these type designs might be used as a single seal design or a combination of seals. This present invention is one of an outside-applied seal, over the pipe joint connection, and can be the only seal, or a seal secondary to that of the original design. The fluid-tight integrity of pipe joints is critical in pipe systems such as those employed in sewage treatment, water and storm pipe networks, for two main reasons. First, if the surrounding soil has a high water table relative to the pipe and/or a soil aquifer leading from surface storm water, infiltration from this outside source into the pipe increases demand on the treatment plant designed capacity. If the treatment plant is overloaded, then the untreated combination surge will have to be dumped directly into the river or ocean. Second, if the water table is lower than the pipe, then infiltration from the pipe network out into the surrounding soil and into the lower water table occurs. In the case of a sanitary or chemical sewer system this contamination is a serious problem.

SUMMARY OF THE INVENTION

It is the purpose of this invention to provide a flexible pipe joint seal, that when applied around the outside circumference of an in-ground pipe joint connection, will insure the fluid-tight integrity of that joint.

It is another object of this invention to provide a flexible pipe joint seal that is flexible.

Still another object of this invention, is to provide a flexible pipe joint seal that consists of essentially only two parts.

A further object of this invention is to provide a flexible pipe joint seal that has as its outer part a strip of flexible plastic-like material of varying width and thickness to meet design requirements of flexible strength.

Another purpose of this invention is to provide a flexible pipe joint seal that has as its inner part, that adjacent to the outer pipe surface at the pipe joint connection, a sealant material that is pliable, and is of designed thickness based on, for example, pipe surface texture. This sealant material can be of the same width as the outer part strip, or it may be applied on a finite width along each edge, leaving a void between the two widths.

Still another object of this invention, is to provide a flexible pipe joint seal that has as its inner part, a sealant material that is bonded to the underside of the outer part, or a sealant material that is separate from the outer part.

An object of this invention is to provide a flexible pipe joint seal, that when applied around the outer circumference of the pipe joint connection, can be overlapped at preferably the top of the pipe area, and secured with tape at this overlap.

Still further, it is the object of this invention to provide a flexible pipe joint seal that when applied around the pipe at the pipe joint connection, and later, the trench containing the pipe system back filled with soil, incorporates the soil pressed against the flexible pipe joint seal, causing the sealant material to conform with the adjacent pipe surface, and, in combination with the flexible plastic-like strip covering, seals the pipe joint connection.

Another object of this invention is to provide a flexible pipe joint seal, that when installed around the pipe connection joints of a functioning, in ground pipe network, is such that when the pipe joint connection(s) experiences movement, the flexible pipe joint seal outer part is designed to resist failure of tearing, due to its flexible strength, thereby causing the pipe end(s) at the joint(s) to slip along the surface between the sealant and pipe and/or the sealant and plastic-like material, and since the sealant is of pliable material, it will remold to maintain the seal.

BRIEF DESCRIPTIONS OF THE DRAWING

FIG. 1 is a perspective view of three pipe connected sections, without surrounding soil shown, the flexible plastic-like wrapping installed around the pipe joints, overlapping at the top of the pipe, with the overlap taped to secure the wrap.

FIG. 2 is a pipe sectional view, taken at the joint area, with the flexible plastic-like wrapping shown on the outside, lapping at the top and taped. The excavation undercut at the joint area is shown below the pipe.

FIG. 3 shows a sectional detail at the pipe joint, with the flexible plastic-like wrap. The outer surface of the flexible plastic-like wrap is the flexible plastic-like material. The inner material shown is the backing sealant.

FIG. 4 is a sectional detail at the pipe joint, showing the lap area of the flexible plastic-like wrap area. The lap is shown of the two layers of materials shown in FIG. 3. The tape for securing the flexible plastic-like wrap in position is indicated.

FIG. 5 is a perspective view of the sealant-backed flexible plastic-like wrap laid out flat.

FIG. 6 is a vertical, longitudinal section view showing pipe sections, found in-ground, open trench position. The flexible plastic-like wrapping is shown, along with the excavation cut out at the bottom area below the joints, for access during flexible plastic-like wrap installation. The trench vertical side cut, is shown beyond.

DETAILED DESCRIPTION OF THE INVENTION

Referring to the drawing and particular to FIG. 1, there are shown typical pipe sections 10; the pipe section end joint 12, the typical flexible plastic-like wrapping 11, and the securing tape 13 are indicated. There is not shown any surrounding soil, to allow ease in description. The pipe sections are typically of material such as concrete, ductile iron, plastic, cast iron, steel to name a few. The pipe sections 10 are laid end to end in a typical joint connecting manner. The flexible plastic-like wrapping 11 is installed after two pipe sections 10 are joined. In order to secure this flexible plastic-like wrapping 11, securing tape 13 is installed at the lapped area created by the seal wrapping.

FIG. 2., is a typical section taken through the pipe section, adjacent to the pipe section end joint 12. The soil 15 is shown as soil undercut 21 at this joint area to allow clearance for installer(s) to slide the flexible plastic-like wrapping 11 under and around the pipe connection. The pipe section is shown as concrete 14, for convenience. The flexible plastic-like wrapping 11 is shown overlapping at the top of the pipe section, and secured with the securing tape 13.

FIG. 3., a detail, shows the concrete 14, pipe sections 10, along with the pipe manufacturers joint seal 16, and possible specified joint mortar 17. The flexible plastic-like wrapping 11, is shown positioned over the pipe section end joint 12. This flexible plastic-like wrapping 11, consists of the outer flexible plastic-like wrap 18, and the inner sealant material 19. The outer flexible plastic-like wrap 18 is of thickness and material to provide imperviousness, strength, puncture resistance, and longevity. The width of this outer flexible plastic-like wrap 18, will vary based upon the pipe size and pipe joint configuration. The inner sealant material 19 is of thickness and material to provide imperviousness and pliability, along with some adhesive characteristic. This inner sealant material 19 is full width under the outer flexible plastic-like wrap 18, but can be of variable width under the outer edges of the outer flexible plastic-like wrap 18, if economical and/or job site conditions indicate. The outer flexible plastic-like wrap 18, and the inner sealant material 19 can be bonded for a one step installation or separate materials for a two step installation. This detail describes a pipe joint configuration that is flat in profile. Pipe joint configurations that are bulged outward will be similarly installed, due to the flexible and pliable abilities of the materials. A bell and spigot type joint is an example. Again, this detail describes a flexible pipe joint seal, economically supplied and installed, and allows for pipe joint movement, by flexing, and maintains a seal.

FIG. 4 is a detail showing the concrete 14, of pipe sections 10, along with the pipe manufacturers joint seal 16, and possible specified joint mortar 17. The section detail is taken at the over lap area of the flexible plastic-like wrapping 11, thereby showing two layers. The securing tape 13, is shown that secures this over lap in position. This securing tape 13 can be similar to any typical duct tape, because it is only to secure the flexible plastic-like wrapping 11 until the soil back fill procedure compresses and secures the flexible plastic-like wrapping 11.

FIG. 5 is a perspective view of the flexible plastic-like wrapping 11, shown in a plane position, to further illustrate the features detailed in FIG. 3 FIG. 6 is a longitudinal, vertical section taken to show the side view of the pipe installation, in the in-ground trench position. The vertical cut for the trench 20, is shown above and beyond the pipe sections. The flexible plastic-like wrapping 11 is shown installed. The soil undercut 21 below the connection is shown. As described in FIG. 2, this undercut allows for the installation of the flexible plastic-like wrapping 11.

We claim:

1. An in-ground pipeline comprising:
   a. A flexible pipe joint seal that is applied around the outside circumference of an in-ground pipe joint connection, to insure the fluid-tight integrity of a joint;
   b. the flexible pipe joint seal that consists of three parts, comprising:
      I. an outer part, comprising a strip of flexible, water-impervious, pliable plastic;
      ii. an inner part, comprising a non-curing sealant material layer that covers either edges or full width of an underside of the flexible plastic, configured to attach to a pipe, adjacent the pipe's outside circumference;
      iii. a third part, comprising an adhesive tape, applied at the overlap area, secures the flexible pipe joint seal;
   c. wherein the flexible pipe joint seal has the inner part (1.b. ii), bonded to the underside of the outer part (1.b. i);
   d. wherein the flexible pipe joint seal has the inner part (1.b. ii), separate from the outer part (1.b. i);
   e. wherein the installed flexible pipe joint seal, along with soil backfill, causes the inner part (1.b. ii), to conform with adjacent pipe surfaces, and in combination with the outer part (1.b. i) seals the joint; and
   f. wherein the installed flexible pipe joint seal, along with soil backfill, when experiencing pipe joint movement, flexes, remolds the sealant, and maintains the seal.

* * * * *